United States Patent [19]

Hirama

[11] Patent Number: 4,959,652
[45] Date of Patent: Sep. 25, 1990

[54] METALIZED FILM CAPACITOR AND METHOD OF MANUFACTURING THE SAME

[75] Inventor: Eiichi Hirama, Nagai, Japan

[73] Assignee: Marcon Electronics Company, Ltd., Nagai, Japan

[21] Appl. No.: 400,874

[22] Filed: Aug. 30, 1989

[30] Foreign Application Priority Data

Sep. 2, 1988 [JP] Japan ............... 63-116248[U]

[51] Int. Cl.$^5$ .................. H01G 1/14; H01G 7/00
[52] U.S. Cl. ........................ 361/310; 29/25.42
[58] Field of Search .......... 361/308, 309, 310, 306, 361/540

[56] References Cited

U.S. PATENT DOCUMENTS

| | | | |
|---|---|---|---|
| 2,940,161 | 6/1960 | Elarde | 361/308 X |
| 3,452,257 | 6/1969 | Belko | 361/308 |
| 4,102,021 | 7/1978 | Nakao et al. | 361/309 X |
| 4,168,520 | 9/1979 | Coleman et al. | 361/308 |
| 4,777,558 | 10/1988 | Endo | 361/306 |

FOREIGN PATENT DOCUMENTS

| | | |
|---|---|---|
| 59-143314 | 8/1984 | Japan . |
| 60-37235 | 3/1985 | Japan . |
| 60-192432 | 12/1985 | Japan . |
| 61-27223 | 2/1986 | Japan . |
| 61-263113 | 11/1986 | Japan . |
| 62-30324 | 2/1987 | Japan . |
| 62-180926 | 11/1987 | Japan . |

Primary Examiner—Donald A. Griffin
Attorney, Agent, or Firm—Oblon, Spivak, McClelland, Maier & Neustadt

[57] ABSTRACT

A metalized film capacitor according to the present invention includes a capacitor element obtained by winding or stacking metalized films, solder layers respectively formed on outermost layers on both end faces of the capacitor element, and a coating resin which coats the capacitor element. Exposed electrodes of the capacitor are obtained by polishing and removing the coating resin from the solder layers to entirely or partially expose the solder layers. The melting point of the exposed electrode is slightly higher than that of a surface-mounting solder, and therefore good soldered portions can be obtained without causing fusing or deformation of the electrodes.

12 Claims, 5 Drawing Sheets

METALIZED FILM CAPACITOR AND METHOD OF MANUFACTURING THE SAME

BACKGROUND OF THE INVENTION

1. Field of the Invention

The present invention relates to a metalized film capacitor obtained by winding or stacking metalized films, and method of manufacturing the same, and, more particularly, to a surface-mounting metalized film capacitor which can be surface-mounted on a printed circuit board.

2. Description of the Related Art

In recent years, more compact electronic components incorporated in circuits are produced with remarkable increases in packing densities of electronic circuits in the field of electronics. In particular, strong demand has arisen for compact large-capacitance capacitors which can be surface-mounted on printed circuit boards. A typical conventional compact large-capacitance capacitor is a metalized film capacitor. When a surface-mounting metalized film capacitor is generally manufactured, resin films are metalized, and the metalized films are insulated from each other while being wound or stacked. Electrodes are then mounted on the wound or stacked structure.

Published Unexamined Japanese Patent Application No. 59-143,314 discloses a technique for providing a surface-mounting metalized film capacitor. In this prior art, a capacitor element having an outer cover is stored in a case, and lead wires are connected thereto. For this reason, the capacitor becomes bulky, resulting in inconvenience.

Published Unexamined Utility Model Application No. 60-37,235 discloses another technique for providing a surface-mounting metalized film capacitor. In this prior art, each electrode cap is mounted on an internal electrode extraction portion. In this case, since the metalized film capacitor element itself has a low moisture resistance, a resin must be coated on the element by vacuum impregnation or dipping. When the resin is coated on the element by vacuum impregnation or dipping, an insulating layer is formed on the surface of the element electrodes. When the electrodes are soldered during surface-mounting, soldering cannot be performed. Even if soldering of the electrodes can be achieved, high reliability of the soldered portions cannot be guaranteed. In addition, a high-precision metal cap accurately fitted on the outer surface of the element is required, thus degrading productivity.

Published Unexamined Japanese Patent Application No. 61-27,223 describes still another technique for providing a surface-mounting metalized film capacitor. In this prior art, after an external electrode plate is mounted on a capacitor, the resultant structure is molded with a resin. In this prior art, however, since the external electrode plate is employed, the capacitor product is undesirably bulky. In addition, a special lead frame is required, and other components such as a mold for molding the element with a resin are also required. For this reason, the manufacturing steps are complicated as compared with the case wherein the lead wires are extracted.

SUMMARY OF THE INVENTION

It is an object of the present invention to provide a compact metalized film capacitor having high reliability.

It is another object of the present invention to provide a method of manufacturing a metalized film capacitor which can easily be surface-mounted on a printed circuit board or the like without using other components.

According to an aspect of the present invention, there is provided a metalized film capacitor comprising: a capacitor element obtained by winding or stacking metalized films, conductive layers respectively formed on outermost layers of both end faces of the capacitor element and consisting of a material having a melting point higher than a surface-mounting heating temperature, and a coating resin for covering the capacitor element, wherein the coating resin is removed to expose the conductive layers, thereby constituting a pair of electrodes of the capacitor element.

According to another aspect of the present invention, there is provided a method of manufacturing a metalized film capacitor, comprising the steps of: winding or stacking metalized films to form a capacitor element; flame-spraying a conductor to outermost layers of both end faces of the capacitor element to form conductive layers, the conductor consisting of a material having a melting point higher than a surface-mounting heating temperature; coating a resin on the capacitor element and the conductive layers; and polishing the resin which coats the conductive layers to expose the conductive layers, thereby constituting a pair of electrodes.

In the step of forming the conductive layers, a solder is flame-sprayed to the outermost layers of both end faces of the capacitor element to obtain the conductive layers each preferably having a thickness of 0.2 mm or more. The reason why the thickness of each conductive layer is set to 0.2 mm or more lies in that part (about 0.1 mm or more) of each conductive layer is also polished during polishing of the coating resin. That is, when a metal conductive layer is formed by flame spraying, surface roughness of 0.1 mm or less occurs on the surface of the metal conductive layer. The coating resin is strongly bonded to the rough surface of the metal conductive layer. Even if the resin is polished by its thickness, the resin is left on the rough surface, thus causing incomplete soldering.

The size of the metalized film capacitor varies depending on a winding error of the element itself and conditions of a spraying pattern of the metal conductive layer. When the removal amount of the conductive layer (metal conductive layer) is adjusted, the size of the capacitor element can advantageously be made uniform. In this case, it is preferable to remove the resin coating with sandpaper (emery paper) or the like because the finished surface of the exposed electrode can be a rough surface suitable for soldering.

A solder such as an Sn-Pb soft solder having a melting point of 180° C. or more is preferably used to form the conductive layers because the melting point of the solder used for surface-mounting a capacitor on a printed circuit board is about 160° C. That is, the melting point of the conductive layer is set to be higher than that of the solder used for surface-mounting the element on the circuit board. Therefore, fusing of the exposed electrodes by surface-mounting heating can be prevented, and deformation and degradation of the exposed electrodes can be prevented.

It is preferable, for two reasons, that the steps of coating the resin on the capacitor element be either vacuum impregnation or dipping. First, when vacuum impregnation or dipping is used, neither lead frames nor molds need to be used, which would be required for molding the capacitor with a resin. Hence, it is easy to mount the capacitor element on a printed circuit board. Second, when vacuum impregnation or dipping is employed, the gaps among the metal particles of the conductive layers; the layers therefore remain moisture-resistant even if their surface portions are removed. Thus, the capacitor element is greatly moisture-resistance.

In the step of forming the conductive electrodes, the resin which coats the conductive layers need not be removed from the entire surfaces of the conductive layers. Part of the resin may be removed to partially expose each conductive layer. When partially exposed electrodes are to be formed, the edges of the capacitor may be cut, or grooves may be formed in any other portions.

DETAILED DESCRIPTION OF THE PREFERRED EMBODIMENTS

Figure 1:
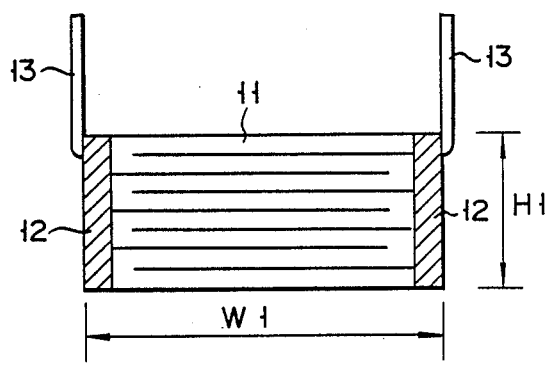
FIG. 1 is a sectional view showing a capacitor prior to resin coating according to a first embodiment of the present invention.

Various embodiments of the present invention will be described with reference to the accompanying drawings.

First Embodiment (Parallel Conductor Type Metalized Film Capacitor)

A parallel conductor type metalized film capacitor and its manufacturing method will be described in detail with reference to FIGS. 1 to 5.

(I) A metalized film having an aluminum layer serving as a conductor portion 11b deposited on one surface of a polyester film 11a is prepared as a material for a capacitor element. This metalized film has a thickness of 5 μm and a width of 13 mm. Coil-like metalized films are respectively mounted on two small-diameter reels, simultaneously supplied to a large-diameter reel, and wound until the thickness of a multilayered structure reaches 4.4 mm (step 101). The wound films constitute a multilayered film ring.

(II) Different types of metals are sprayed on both end faces of the multilayered ring to form multilayered metal layers. In this case, a solder material is sprayed to the outermost metal layers to form 0.9 mm thick electrode layers 12 (step 102). The solder material is Sn-Pb alloy and its melting point is about 230° C.

Figure 4:
FIG. 4 is a partial sectional view of the capacitor.

As shown in FIG. 4, every other aluminum conductive portions 11b of the dielectric films are brought into contact with either electrode layer 12. That is, the aluminum conductive portions 11b are electrically alternately connected to one electrode layer 12 and the other electrode layer 12 (not shown).

(III) In order to adjust the shape of each multilayered ring and stabilize the electrical connections between the metal layers (including the electrode layers 12) and the aluminum conductive portions 11b, the multilayered ring is charged in a heating furnace while being kept wound around the reel. The multilayered ring is heat-treated under predetermined conditions (step 103).

(IV) After the heat treatment, the multilayered ring is cut into halves by a cutter and the starting elements are removed from the reel (step 104).

(V) Each divided starting element is further cut at a predetermined pitch to obtain a rectangular capacitor element 11 having a height $H_1$ of 6.6 mm, a width $W_1$ of 15.4 mm, and a thickness of 4.4 mm (step 105). The resultant capacitor element 11 has a rated capacitance of 0.33 μF at 250 V.

(VI) As shown in FIG. 1, support wires (lead wires) 13 are respectively welded on the outer surfaces of the electrode layers 12, respectively (step 106). The support wire 13 has a diameter of 0.6 mm and a length of 40 mm. The pair of support wires 13 serve as support rods in a coating step (step 108) and a coating resin removal step (step 109).

(VII) Free ends of the wires 13 are fixed by taping so that a large number of capacitor elements 11 are aligned in line (step 107).

(VIII) A large number of capacitor elements 11 fixed by taping are charged in a vacuum impregnation apparatus, and an epoxy resin as a coating resin 14 is coated on the elements 11 and the electrode layers 12 (step 108). The thickness of the coating resin 14 is about 0.05 to 0.1 mm.

Figure 2:
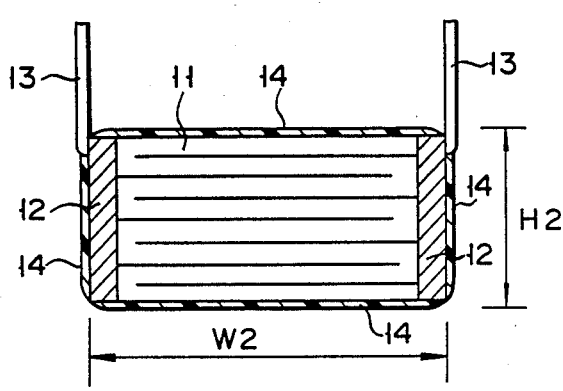
FIG. 2 is a sectional view showing a capacitor after resin coating according to the first embodiment of the present invention.

As shown in FIG. 2, each element 11 after coating has a height $H_2$ of 6.8 mm and a width $W_2$ of 15.5 mm.

(IX) A large number of elements 11 after coating with the resin are aligned in line and are fixed by an element jig. At this time, the electrode layers 12 of the adjacent elements are located to be adjacent to each other. Emery paper (sandpaper) is attached to the distal end of a drill of an end mill and is rotated while the emery paper is urged against the coating resin 14 of the elements 11.

Figure 3:
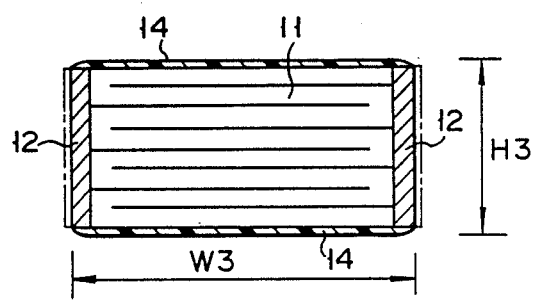
FIG. 3 is a sectional view showing the capacitor of the first embodiment after the coating resin is polished and removed.

As shown in FIG. 3, the coating resin 14 which covers each electrode layer 12 is polished by a thickness of about 0.15 mm to obtain finished products (step 109). In this case, each electrode layer 12 is partially removed in addition to the coating resin 14. For this reason, the width $W_3$ of each element 11 after polishing is 15.2 mm. The wires 13 are then removed from the finished products.

(X) The metalized film capacitor thus manufactured was soldered to a printed circuit board by using a cream solder having a melting point of 160° C. No degradation of capacitor characteristics (e.g., capacitance $\Delta C$ and tangent of dielectric loss angle tan $\delta$) was found. In addition, the electrode layers 12 of the capacitor did not flow out, and the capacitor could be satisfactorily soldered.

When a soldering test of 200 capacitor samples was performed, there were no samples subjected to defects such as pinholes and incomplete connections.

A similar soldering test was conducted for capacitors each having Zn electrodes as the outermost layers of the metal layers. Contrary to the above case, there were 38 defective samples out of 200 samples. Judging from these test results, the metalized film capacitor of this embodiment is excellent in the soldering property.

Since the electrode layers 12 are also polished in addition to the thickness of about 0.05 mm of the coating resin 14, so that a total thickness for polishing is about 0.15 mm, the electrode layers 12 are completely exposed. In addition, flatness of the exposed surface of the electrode layer 12 can be improved, thereby improving the soldering property.

Variations in widths $W_1$ and $W_3$ of the capacitor element 11 in the respective manufacturing steps will be described with reference to FIGS. 6 and 7.

Figure 6:
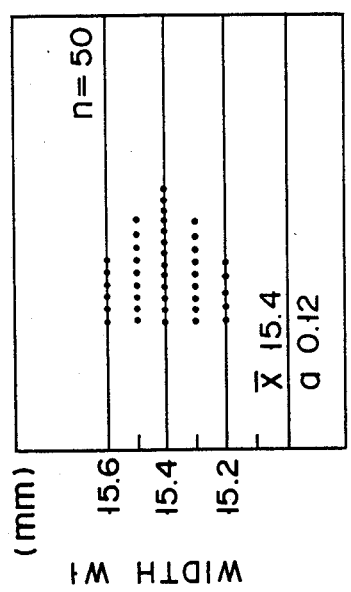
FIG. 6 is a view showing a distribution of a width $W_1$ of the capacitor element (state of FIG. 1) prior to resin coating.

FIG. 6 is a graph showing measurement values of the widths $W_1$ of the 50 capacitor samples after metal spraying but before resin coating. As is apparent from the graph, the widths $W_1$ vary within the range of $\pm 0.2$ mm from a target value of 15.4 mm. In this case, an average width was 15.4 mm and a standard deviation was 0.12.

Figure 7:
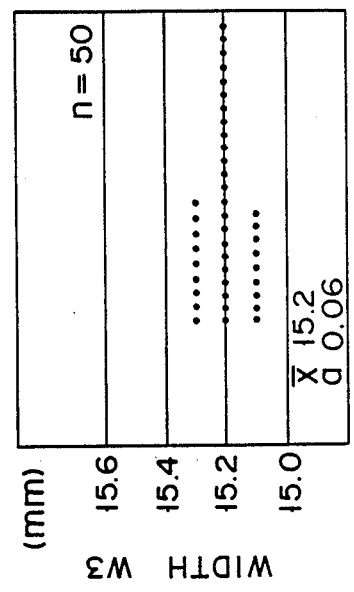
FIG. 7 is a view showing a distribution of a width $W_3$ of the capacitor (state of FIG. 3) after the coating resin is polished and removed.
Figure 5:
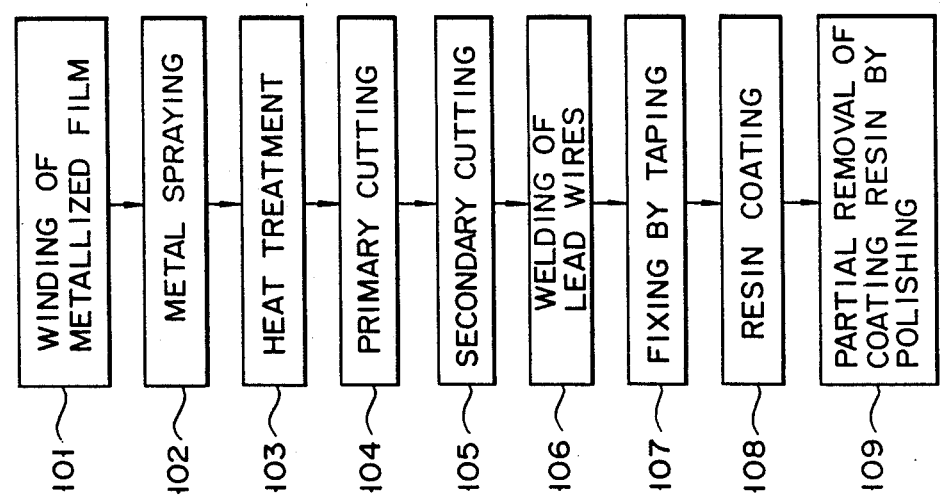
FIG. 5 is a process chart for explaining a method of manufacturing the capacitor (parallel conductor type capacitor) of the capacitor of the first embodiment.

FIG. 7 is a graph showing measurement values of widths $W_3$ of 50 capacitor element samples after the coating resin is polished and removed. As is apparent from the graph, the widths $W_3$ vary with the range of $\pm 0.1$ mm from a target value of 15.2 mm. In this case, the average width was 15.2 mm and the standard deviation was 0.06.

Changes in capacitance $\Delta C$ and tangent of dielectric loss angle tan $\delta$ of the capacitor elements in the respective manufacturing steps will be described with reference to FIGS. 8 and 9. In this case, the capacitance $\Delta C$ and the tangent of dielectric loss angle tan $\delta$ were measured under humid test conditions. That is, a test temperature was 40° C. and a humidity was 90 to 95% RH.

Figure 8:
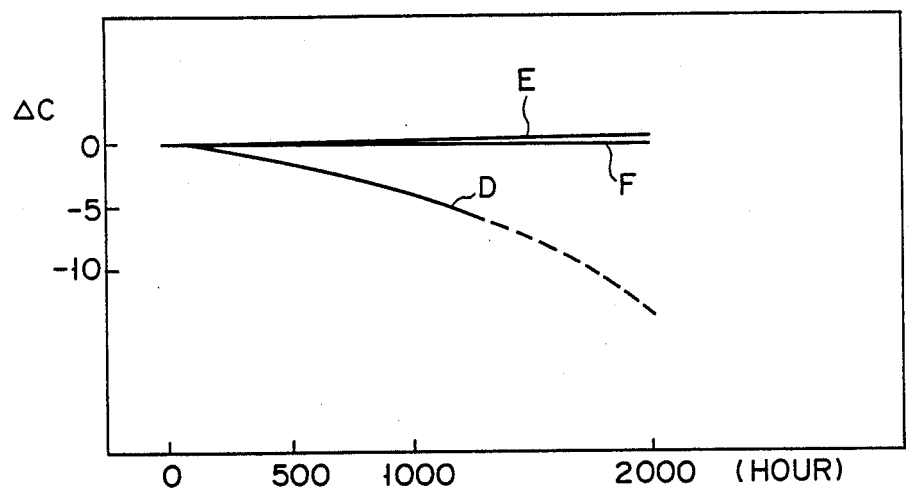
FIG. 8 is a graph showing changes in capacitance $\Delta C$ when the capacitor elements in the respective manufacturing steps are left to stand under predetermined conditions.

FIG. 8 is a graph showing changes in capacitance $\Delta C$ in the respective manufacturing steps as a function of time when a time for leaving the capacitor elements to stand in the above conditions is plotted along the abscissa and the capacitance $\Delta C$ is plotted along the ordinate. A curve D represents a test result of the capacitor element (element in the step of FIG. 1) prior to resin coating, a curve E represents a test result of the capacitor element (element in the step of FIG. 2) after resin coating, and a curve F represents a test result of the capacitor element (element in the step of FIG. 3) after removal of the coating resin. As is apparent from FIG. 8, the curve D representing the first step exhibited a great decrease in capacitance $\Delta C$ after a lapse of 1,000 hours. However, no substantial changes in capacitances $\Delta C$ were found in the curve E of the second step and the curve F of the third step after a lapse of 2,000 hours.

Figure 9:
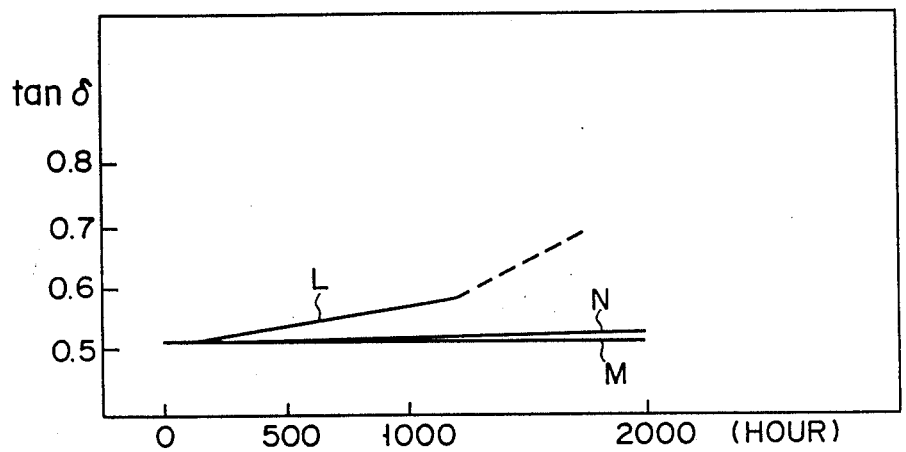
FIG. 9 is a graph showing changes in tangent of dielectric loss angle (tan δ) when the capacitor elements in the respective manufacturing steps are left to stand under predetermined conditions.

FIG. 9 is a graph showing changes in tangent of dielectric loss angle tan $\delta$ of the capacitor elements in the respective steps as a function of time when a time for leaving the capacitor element to stand in the above conditions is plotted along the abscissa and the tangent of dielectric loss angle tan $\delta$ is plotted along the ordinate. A curve L represents a test result of the capacitor element (element in the step of FIG. 1) prior to resin coating, a curve M represents a test result of the capacitor element (element in the second step of FIG. 2) after resin coating, and a curve N represents a test result of the capacitor element (element in the third step of FIG. 3) after the coating resin is removed. As is apparent from the graph in FIG. 9, the dielectric loss tangent tan $\delta$ represented by the curve L of the first step was greatly increased after a lapse of 1,000 hours. However, no substantial changes in dielectric loss tangent tan $\delta$ were found in the curves M and N of the second and third steps even after a lapse of 2,000 hours.

Figure 10:
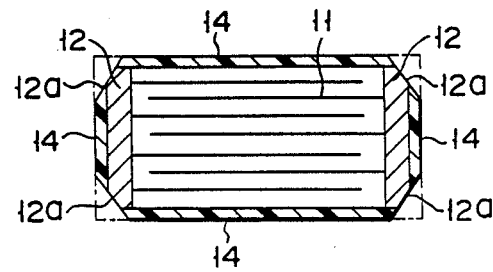
FIG. 10 is a sectional view showing a modification (partially exposed electrode) of the capacitor of the first embodiment.
Figure 11:
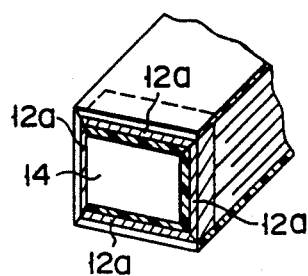
FIG. 11 is a perspective view showing part of a partially exposed electrode type capacitor shown in FIG. 10.

A modification of the first embodiment will be described with reference to FIGS. 10 and 11.

In this modification, only edges of the end faces are cut and removed to partially expose the metal layers 12. More specifically, in step 109, instead of exposing the entire surfaces of the metal layers 12, only four corners of the resin 14 which covers the metal layers 12 are cut and removed to form exposed electrodes 12a.

When the electrodes 12a are formed at four corners, the capacitor can be easily surface-mounted. That is, even if the capacitor is supplied upside down, the capacitor can be surface-mounted on the printed wiring board.

Other modifications of the first embodiment will be described with reference to FIGS. 12 to 16, respectively.

Figure 12:
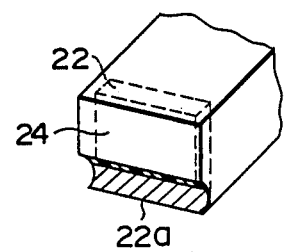
FIGS. 12 to 16 are perspective views showing other modifications of the parallel conductor type capacitors.
Figure 13:
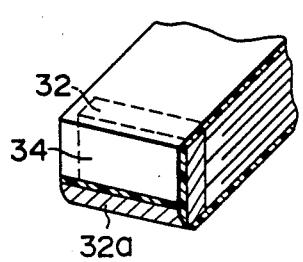

Referring to FIGS. 12 and 13, one side of each electrode layer is exposed. In the capacitor of FIG. 12, a coating resin 24 and an electrode layer 22 are polished and removed to constitute an electrode exposed surface 22a as a concave surface. When the exposed surface 22a has a concave surface, a fused solder tends to flow in a recess, thus more perfectly surface-mounting the capacitor.

In the capacitor of FIG. 13, a coating resin 34 and an electrode layer 32 are polished and removed to constitute an electrode exposed surface 32a as a convex surface. When the exposed surface 32a has a convex surface, a gap between the exposed surface 32a and the printed circuit board can be reduced, and the fused solder can easily enter in the gap, thereby increasing the bonding strength.

Figure 14:
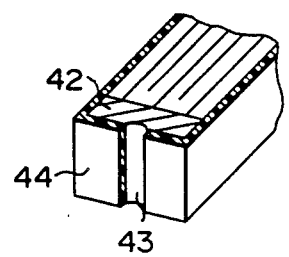
Figure 15:
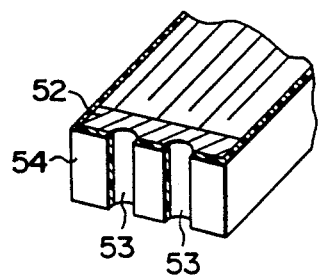
Figure 16:
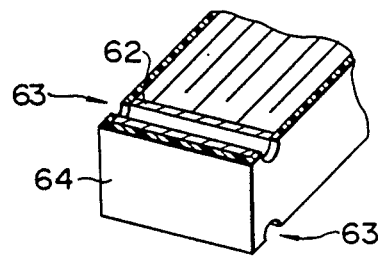

Each of FIGS. 14 to 16 shows one end portion of a partial coating, parallel conductor type metalized film capacitor. In the capacitor shown in FIG. 14, one groove 43 is formed on the surface of a coating resin 44 to partially expose an electrode layer 42. In the capacitor shown in FIG. 15, two grooves 53 are formed on the surface of a coating resin 54 to expose an electrode layer 52.

When a groove or grooves are formed on part of the exposed electrode, the fused solder can flow along the groove or grooves, thereby improving soldering performance. In addition, even if the capacitor is surface-mounted upside down, no problem is posed, thus facilitating the mounting operation.

In the capacitor of FIG. 16, grooves 63 are respectively formed on the upper and lower exposed surfaces of electrode layers 62 along their longitudinal direction.

In these capacitors, the fused solder runs along the grooves 63 to improve the bonding strength.

Second Embodiment (Coiled Conductor Type Metalized Film Capacitor)

Figure 17:
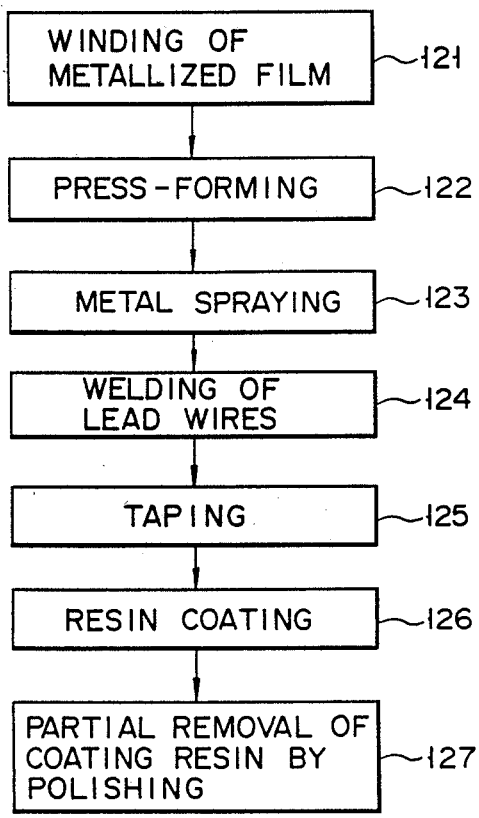
FIG. 17 is a process chart for explaining a method of manufacturing a capacitor (coiled conductor type capacitor) of a second embodiment of the present invention.

A method of manufacturing a coiled conductor type metalized film capacitor will be described in detail with reference to FIG. 17.

(I) A metalized film having an aluminum layer as a conductive portion 11b deposited on one surface of a polyester film 11a is prepared as a material for a capacitor element. The metalized film has a thickness of 5 $\mu$m and a width of 13 mm. The metalized film is wound in a coil-like shape until its outer diameter reaches 7.3 mm (step 121).

(II) The film coil is pressed in a direction perpendicular to its axial direction to obtain a flat rectangular starting element (step 122). The starting element has a height $H_4$ of 9.0 mm, a width $W_4$ of 13.5 mm, and a thickness of 4.3 mm. A resultant capacitor element 11 has a rated capacitance of 0.33 $\mu$F at 250 V.

(III) Multilayered metal layers are formed on both end faces of the film coil by metal spraying. A solder material is sprayed on the outermost layers to form 0.9 mm thick electrode layers (step 123). The solder material is a Sn-Pb alloy and its melting point is about 230° C.

(IV) Metal wires (lead wires) are respectively welded to the outer surfaces of the electrode layers (step 124).

(V) Free ends of the pair of wires are fixed by taping so that a large number of capacitor elements are aligned in line (step 125).

(VI) A large number of capacitor elements fixed by taping are charged in a vacuum impregnation apparatus, and an epoxy resin is coated on the elements and the electrode layers (step 126). The thickness of the coating resin falls within the range of about 0.05 to 0.1 mm.

(VII) A large number of elements after coating with the resin are aligned in line and are fixed by an element jig. At this time, the electrode layers 12 of the adjacent elements are located to be adjacent to each other. Emery paper (sandpaper) is attached to the distal end of a drill of an end mill and is rotated while the emery paper is urged against the coating resin of the elements. The coating resin which covers the electrode layers is polished (step 127). In this case, the electrode layer is partially removed in addition to the coating resin. The width of the capacitor element after polishing is 15.0 mm. The support wires are moved from finished products.

(VIII) The metalized film capacitor thus manufactured is soldered to a printed wiring board by using a cream solder having a melting point of 160° C. Degradation of capacitor properties (e.g., capacitance $\Delta C$ and tangent of dielectric loss angle tan $\delta$) were not found. The electrode layer of the capacitor element does not flow out, thus performing perfect soldering of the capacitor.

A soldering test of 200 capacitor samples was conducted, and there were no defects such as pinholes and incomplete connections.

A similar soldering test of a comparative example for capacitors having zinc electrodes as the outermost layers of the metal layers was conducted. Contrary to the above case, soldering defects were found in 40 capacitor samples out of 200 samples. Therefore, the coiled conductor type metalized film capacitor of the above example is excellent in soldering property.

As has been described above, the metalized film capacitor according to the present invention uses a solder material in electrode layers of the capacitor element, so that soldering performance during surface-mounting can be improved. In particular, since the melting point of the exposed electrodes is slightly higher than that of the solder used for surface-mounting, the electrodes are not fused or deformed, thereby obtaining a good soldered portion.

In addition, only a necessary portion of the coating resin is removed, and the moisture resistance of the capacitor is not impaired. Therefore, degradation of capacitance $\Delta C$ and tangent of dielectric loss angle tan $\delta$ is not found.

Furthermore, the lead frames and resin molds used in conventional surface-mounting can be eliminated.

Moreover, even if the capacitor is supplied upside down, it can be properly mounted on a printed circuit board, thereby improving workability.

What is claimed is:

1. A metalized film capacitor comprising:
    a capacitor element obtained by winding or stacking metalized films;
    porous conductive layers respectively formed on outermost layers on both end faces of said capacitor element and made of a metal having a melting point higher than a surface-mounting heating temperature; and
    a coating resin which coats said capacitor element and a part of which is impregnated into said porous conductive layers, said coating resin being removed to expose said conductive layers including the resin, thereby constituting exposed portions as a pair electrodes of the capacitor element.

2. The capacitor according to claim 1, wherein said conductive layers are made of a solder having a melting point of not less than 180° C.

3. The capacitor according to claim 2, wherein the solder is an Sn-Pb soft solder.

4. The capacitor according to claim 1, wherein each of said conductive layers has a thickness of not less than 0.2 mm.

5. The capacitor according to claim 1, wherein said electrodes are formed by entirely exposing said conductive layers.

6. The capacitor according to claim 1, wherein said electrodes are formed by partially exposing said conductive layers.

7. The capacitor according to claim 6, wherein each of said exposed portions of said conductive layers includes a groove 8. The capacitor according to claim 7, wherein said groove is formed on an end face of an electrode layer.

9. The capacitor according to claim 7, wherein said groove is formed on each of upper and lower surfaces of said electrode layers.

10. A method of manufacturing a metalized film capacitor, comprising the steps of:
   winding or stacking metalized films to form a capacitor element;
   flame-spraying a conductor to the outermost layers of both end faces of the capacitor element to form porous conductive layers, the conductor consisting of a metal having a melting point higher than a surface-mounting heating temperature;
   coating a resin on the capacitor element and the porous conductive layers so as to impregnate a part of the resin into the porous conductive layers; and
   removing the resin which coats the conductive layers to expose the conductive layers including the resin, thereby constituting a pair of electrodes of the capacitor element.

11. The method according to claim 10, wherein the step of flame-spraying the conductor comprises the step of flame-spraying a solder having a melting point of not less than 180° C. to form the conductive layers.

12. The method according to claim 10, wherein the step of coating the resin comprises the step of connecting support wires respectively to outer surfaces of the conductive layers and coating the resin by dipping or vacuum impregnation while the capacitor element is being supported by the support wires.

* * * * *